United States Patent [19]

Sasaki

[11] Patent Number: 5,049,276
[45] Date of Patent: Sep. 17, 1991

[54] HOLLOW FIBER MEMBRANE

[75] Inventor: Jun Sasaki, Kanagawa, Japan

[73] Assignee: Fuji Photo Film Co., Ltd., Kanagawa, Japan

[21] Appl. No.: 421,564

[22] Filed: Oct. 11, 1989

[30] Foreign Application Priority Data

Oct. 13, 1988 [JP] Japan .................. 63-257651
Oct. 13, 1988 [JP] Japan .................. 63-257652
Oct. 13, 1988 [JP] Japan .................. 63-257653

[51] Int. Cl.$^5$ .................. D01D 5/24; D01F 1/08
[52] U.S. Cl. .................. 210/500.23; 210/500.27; 210/500.41; 264/177.14; 428/376
[58] Field of Search ............. 210/500.21, 500.23, 210/500.27, 510.1, 503, 500.41, 500.43; 428/376; 521/64; 264/177.14

[56] References Cited

U.S. PATENT DOCUMENTS

| 3,871,950 | 3/1975 | Hashimo et al. | 210/500.23 |
| 4,604,326 | 8/1986 | Manabe et al. | 210/500.23 |
| 4,612,119 | 9/1926 | Eguchi | 210/500.23 |
| 4,814,228 | 3/1989 | Onorato et al. | 210/500.23 |
| 4,822,489 | 4/1989 | Nohmi et al. | 210/500.23 |

FOREIGN PATENT DOCUMENTS

| 0023664 | 2/1981 | European Pat. Off. . | |
| 0206354 | 12/1986 | European Pat. Off. | 210/500.23 |
| 54-10282 | 6/1977 | Japan | 210/500.23 |
| 60-197288 | 10/1985 | Japan | 210/500.23 |
| 1506785 | 4/1978 | United Kingdom . | |
| 08969 | 4/1981 | World Int. Prop. O. | 210/500.23 |

Primary Examiner—Jay H. Woo
Assistant Examiner—Khanh P. Nguyen
Attorney, Agent, or Firm—Sughrue, Mion, Zinn, Macpeak & Seas

[57] ABSTRACT

A hollow fiber membrane in which the pore size changes in such manner that it gradually decreases in the direction from the outside surface of the hollow fiber to the inside and the minimum pore size gradually increases toward the opening of the inside surface. The change in the pore size is also continuous.

2 Claims, 2 Drawing Sheets

FIG. 3

FIG. 1
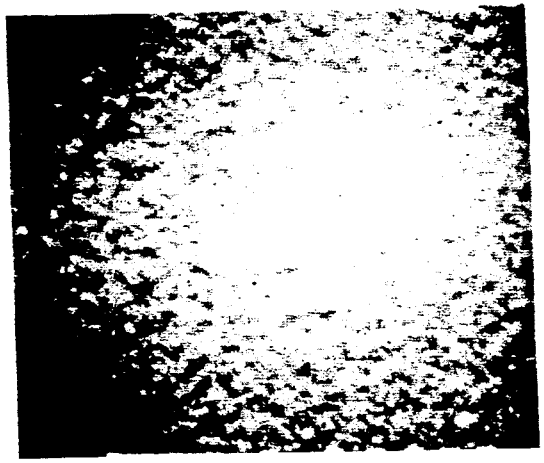
FIG. 2
FIG. 3
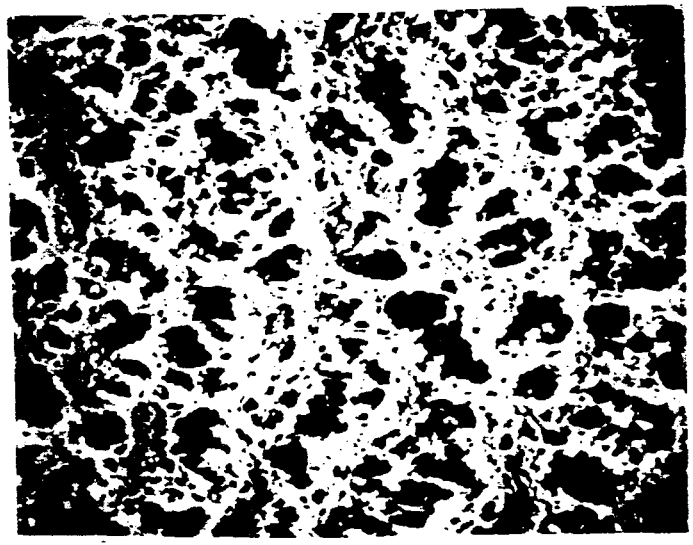

5,049,276

HOLLOW FIBER MEMBRANE

FIELD OF THE INVENTION

This invention relates to a hollow fiber membrane and processes for producing the same. More particularly, this invention relates to a dry hollow fiber membrane of an anisotropic structure having a low filtration resistance and a high water permeability. Further, this invention relates to a process for producing a hollow fiber membrane having a high water-permeation rate, the process comprising producing a hollow fiber membrane by discharging a film forming solution simultaneously with a coagulating solution through a hollow tubular nozzle to conduct dry-and-wet spinning.

BACKGROUND OF THE INVENTION

Membrane structures of conventionally known hollow fiber membranes include (1) membranes which comprise an inside surface and an outside surface both made of a skin layer and an intermediate spongy or finger-like structure therebetween, as described in, for example, JP-A-56-105704 (The term "JP-A" as used herein means an "unexamined published Japanese patent application"), JP-A-56-115602, JP-A-58-132111, JP-A-58-1156018, JP-A-60-246812 and JP-A-61-164602 and (2) membranes wherein either an inside surface or an outside surface has a dense skin layer and the other is a microporous or porous layer, such as those described in, for example, *Journal of Applied Polymer Science*, Vol. 21, 156 (1977), JP-A-57-82515 and JP-A-58-114702 and HP series membranes made by AMICON CO.

From the standpoint of filtration resistance, the most filtration-resistant portion in these membranes is the portion which possesses minimum pore size (corresponding to the skin layer of the above-described membranes (1) and (2)). Pores formed on the surface of the membrane are of such a low pore-opening ratio (usually several % to ten-and-several %) that it is extremely disadvantageous to form portions with a minimum size on the surface in view of the filtration resistance involved. Therefore, efforts have so far been made to decrease the filtration resistance, for example, by employing a membrane structure such as one in which the thickness of the minimum pore size-layer to be formed on the surface is made extremely thin, with coarse voids being formed in the interior of the membrane. The membrane structure of membrane (2) corresponds to this type. However, this extremely thin dense layer formed on the surface is so susceptible to flaw formation during, for example, the hollow fiber-spinning step or a subsequent module-assembly step that the coarse pore size can be exposed by a slight disturbance. This destroys the reliability of the filtration. Membranes of type (1) or the like having a dense layer on both of the inside and outside surfaces have been devised to counteract this problem. However, membranes of this type have the defect that they have a high filtration resistance due to the presence of the dense layer on both the inside and the outside thereof. As a result, high water permeability is not achieved.

In a dry-and-wet filming process involving casting a film forming solution and immersing the cast film into a coagulating solution, control of the membrane structure to form a porous membrane structure is conducted by, for example, changing the formulation of the film forming solution (e.g., as disclosed in JP-A-60-41503) or changing the formulation of the coagulating bath (e.g., as disclosed in JP-A-56-126407).

However, this technique employed for controlling the structure of sheet-like membrane cannot be employed in the production of hollow fiber membranes. The reasons for this are as follows. Since supports are not used in casting hollow fiber films which is different from sheet-like films, a hollow state cannot be maintained unless the film forming solution discharged through a nozzle is rapidly coagulated by using a poor solvent with a coagulating ability as a core solution. Moreover, since all of the procedures from discharge of the film forming solution to coagulation are dynamically conducted, continuous spinning becomes impossible unless the flow rates of the film forming solution and the core solution, winding speed, etc. are well balanced, leading to frequent thread breakage and deformation of the cross section of the hollow fiber membrane.

Therefore, when employed in the spinning of hollow fiber membranes, the above-described technique which enables a porous membrane of desired structure in sheet-like membranes to be obtained does not assure formation of a porous membrane of desired structure.

With hollow fiber membranes, it is difficult to obtain a large pore size in the inside surface of hollow fiber membranes since a core solution inert to the film forming solution and exerting the same function as a support used in forming a sheet-like membrane cannot be used.

Porous membranes produced by the dry-and-wet process comprise an outside dense layer usually called a skin layer, an intermediate sparse layer called a support layer (porous layer) and an inside dense skin layer. The skin layer is a layer contributing to the separation function across the section of the membrane. The degree of denseness can be said to express the pore size of the membrane. However, a skin layer having this separation function acts in opposition to filtration efficiency, particularly filtration flow rate. That is, the skin layer exhibits such a high filtration resistance that it decreases the filtration flow rate per unit time. Hence, attempts to enlarge the pore size of both or one of the inside and outside skin layers for decreasing filtration resistance have been made. For example, JP-63-92712 discloses a process of enlarging pores in both surfaces by using a triple-ring nozzle for spinning hollow fibers. However, this process enables a pore size of only about 0.3 μm to be obtained. Formation of such skin layer is considered to proceed as follows. First, when contacted with a poor solvent, a diffusion of the solvent of the film forming solution into the poor solvent begins at the interface. At the same time, diffusion of the poor solvent thereinto also begins. In general, the solvent for the film forming solution and the poor solvent used are miscible with each other, and hence their diffusion proceeds so rapidly that rapid coagulation of polymer takes place at the interface between the film forming solution and the poor solvent. As a result, a dense skin layer is first formed, and subsequent diffusion proceeds through this skin layer. Thus, the interior of the membrane has a comparatively porous structure.

SUMMARY OF THE INVENTION

As described above, the skin layers formed by coagulation from both the core solution side and the coagulating solution side at the same time produces filtration resistance in the membrane. In order to make the structure, particularly, of the inside skin layer more sparse, depressing the initial rapid coagulation of the polymer is sufficient. In the present invention, a hollow fiber porous membrane without an inside skin layer and having a coarse and changed membrane structure is successfully obtained by discharging a solvent for the polymer between the film forming solution and the core solution upon discharge of both the film forming solution and the coagulating liquid through a hollow ring nozzle in dry-and-wet spinning.

Thus, filtration resistance due to the conventionally formed skin layer can be decreased, and hollow fiber membranes with high practical value with a high flow rate can successfully be obtained.

As a result of intensive investigations to overcome the above-described defects, the present invention has been achieved. That is, one embodiment of the present invention provides a hollow fiber membrane wherein the pore size continuously changes from the outside surface of the hollow fiber membrane to the inside surface thereof, with a minimum pore size existing in the intermediate portion between the outside surface and the inside surface.

BRIEF DESCRIPTION OF THE DRAWINGS

FIG. 1 is an electron micrograph, with 500× magnification, showing a cross section of the hollow fiber membrane obtained in Example 4.

FIG. 2 is an electron micrograph, with 5000× magnification, showing an outside surface of the hollow fiber membrane obtained in Comparative Example 1.

FIG. 3 is an electron micrograph, with 5000× magnification, showing an outside surface of the hollow fiber membrane obtained in Example 5.

DETAILED DESCRIPTION OF THE INVENTION

Figure 4:
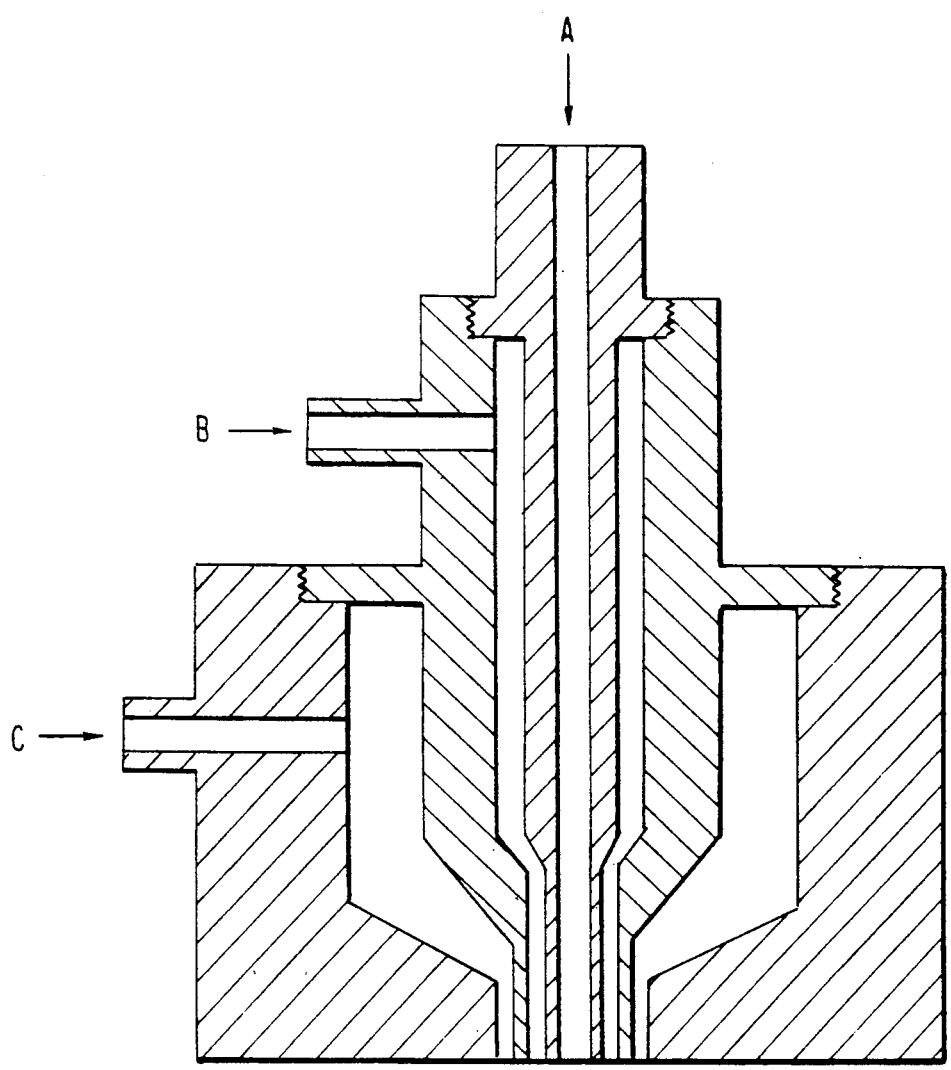
FIG. 4 is a longitudial section of the triple-nozzle which is used in the present invention, wherein A is a poor solvent for polymer, B is a solvent for polymer, and C is a film forming solution (polymer solution).

The hollow fiber membrane has a specific structure not found in conventional membranes in that the pore size is gradually smaller from the inside surface to the outside surface, a minimum pore size is present in an intermediate portion between the outside surface and the inside surface, then the pore size becomes gradually larger, leading to the outside surface.

In the membrane of the present invention, the ratio of this special portion to the skeletal portion, i.e., void volume in the interior portion, amounts to 80% to 85%. Hence the filtration resistance of this interior portion can be made extremely small by forming a portion with minimum pore size in the interior portion. Further, the pore size of pores in the outside and inside surfaces where the ratio of the openings is small is increased to decrease the filtration resistance. Thus the filtration resistance of the total membrane can be decreased. This is an important characteristic of the hollow fiber membrane of the present invention, which provides high water-permeating amount.

Another characteristic feature of the membrane of the present invention is that, since the minimum pore size layer is formed in the interior of the membrane, the layer can be protected from the abrasion in the spinning step and the module-processing step.

Thus, a membrane with low filtration resistance and high filtration reliability can be produced.

Another embodiment of the present invention comprises a process for producing hollow fiber membranes comprising molding a solution of a polymer in a solvent into a hollow form and then immersing the molded product in a coagulating solution, drafting the hollow fiber in the coagulating solution to thereby split only the outside surface of the hollow fiber. Thus, hollow fiber membranes in which a portion with a minimum pore size is present in an intermediate position between the outside surface and the inside surface is produced.

More specifically, the present invention provides a process for producing a hollow fiber membrane showing a decreased filtration resistance at the membrane surface upon filtration. The process comprises discharging a film forming solution through a hollow fiber-spinning nozzle and drafting the hollow fiber in a coagulating solution to thereby split the skin layer formed at the outside surface of the hollow fiber and increase the ratio of openings in the surface.

Conventional hollow fibers possess a skin layer as the outside surface and the inside surface as has been set forth above. Since this skin layer is a pore size-determining layer, i.e., a layer having a minimum pore size, drafting of the skin layer causes the skin layer to split. This results in a serious deterioration in separating ability. However, since the pore size-determining layer of the present invention exists intermediate the outside surface and the inside surface of the membrane, even when the outside surface is split by drafting, the pore size-determining layer in the interior is not changed. Therefore, the water-permeating rate can be improved while maintaining the separation performance of the membrane.

A further embodiment of the present invention provides a process for producing a hollow fiber porous membrane by a dry-and-wet process. This embodiment comprises discharging a solution of a polymer in a solvent through a hollow ring nozzle into a coagulating bath to coagulate the polymer, wherein the nozzle is a triple-ring nozzle, and simultaneously through the inside nozzle of the three ring nozzle is discharged a poor solvent for the polymer, through the intermediate nozzle of the three ring nozzle is discharged a solvent for the polymer, and through the outside nozzle of the three ring nozzle is discharged a film forming solution. The triple-ring nozzle which is used in the present invention is disclosed, for example, in U.S. Pat. No. 4,741,829. The solvent for the polymer and the poor solvent for the polymer may respectively be a mixture of two or more solvents, if desired, with the solvent having a higher solubility for the polymer than the poor solvent.

Polymers which can be used in the present invention are not particularly limited and may be selected considering the end-use of the porous membrane or other purposes. Suitable polymers include, for example, cellulose acetate, nitrocellulose, polysulfone, sulfonated polysulfone, polyether sulfone, polyacrylonitrile, polyamide, polyimide and polyphenyleneoxide.

Of these, polysulfone and/or polyether sulfone is particularly preferable as a film-forming polymer, with those polymers which have the following repeating units being preferable:

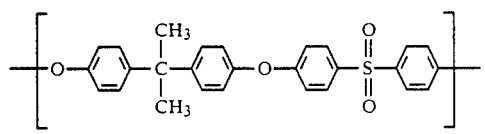

or

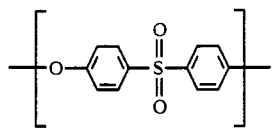

In producing the microporous membrane of the present invention, the above-described polymer is dissolved in (1) a good solvent, (2) a mixed solvent of a good solvent and a poor solvent or (3) a mixture of a plurality of solvents with different solubilities for the polymer to prepare a film forming solution, the solution is then discharged through a hollow fiber-spinning nozzle, and the discharged solution is introduced into a coagulating bath to produce a hollow fiber-like microporous membrane.

The good solvent of the present invention can dissolves a polymer in a concetration of at least 1%. A solubility for the poor solvent is less than 1%. Examples of the good solvent include N-methylpyrrolidone, dimethylacetoamide, tetrahydrofuran, and dimethylformamide. Examples of the bad solvent include water, alcohols (e.g., methanol, ethanol), and glycols (e.g., ethylene glycol, diethylene glycol).

The concetration of the polymer is 5 to 30 wt % in the film forming solution. As a necessary additive, there are a water soluble polymer (e.g., polyvinyl alcohol, polyvinylpyrrolidone, polyethylene glycol) and a salt (e.g., lithium chloride, lithium nitrate, sodium citrate).

Examples of coagulating baths are any of those which do not dissolve the polymer, such as water, alcohols (e.g., methanol, ethanol, butanol), glycols (e.g., ethylene glycol, diethylene glycol), glycerols (e.g., glycerin), ethers and aliphatic hydrocarbons (e.g., n-hexane, n-heptane). Of these, water, an alcohol or a mixture of two or more of these liquids is preferable. The coagulating rate can be increased by adding a proper solvent. For example, N-methyl-2-pyrrolidone may be added in an amount of up to 40% to water. These coagulating solutions may be used as the external solution or as the core solution for the hollow fiber.

The temperature of the coagulating solution is preferably −40° to 80° C., more preferably 0° C. to 60° C. Temperatures higher than 80° C. or lower than 0° C. makes it difficult to obtain a stable hollow fiber surface.

In the first embodiment of the present invention, the spinning rate is 1 to 200 m/min, preferably 5 to 150 m/min. If less than 1 m/min, it becomes difficult to balance the injecting rate of the core solution for well balancing the form of the hollow fiber, and as a result, a hollow fiber with a stable form is not obtained.

On the other hand, if the spinning rate exceeds 200 m/min, hollow fiber with a stable form cannot be obtained due to vibration during traveling of the fiber.

In the first embodiment of the present invention, an important technique for forming the form wherein a portion containing a minimum pore size layer exists intermediate the inside surface and the outside surface of the hollow fiber membrane lies in properly controlling the amount of evaporation of the solvent and the amount of water absorption from the air at the surface of the fiber-state solution while the film forming solution travels from the nozzle to the coagulating bath. For example, the form may be obtained by adjusting the distance between the spinning nozzle and the coagulating bath to 1 to 30 cm, selecting n-hexane and water as a core solution and a coagulating solution, respectively, and passing the fiber-state solution through an atmosphere of a temperature of 0° to 60° C., preferably 10° to 50° C. and a relative humidity of 10 to 80%, preferably 20 to 60%. The space between the nozzle and the coagulating solution may be surrounded by a cylindrical hood to flow the film forming solution in a constant air velocity to form a stable hollow fiber.

In conventional processes for producing hollow fiber membranes, the time interval for the hollow fiber to travel through the air has been examined extensively in view of formation of a skin layer on the outside surface or a finger-type porous layer in the interior of the membrane. On the other hand, the hollow fiber membrane of the present invention has a minimum pore size layer in the interior of the membrane formed by allowing the fiber membrane to absorb water from the outside surface of the film forming solution during its travel through the air.

The reasons for the formation of the minimum pore size-containing portion in the interior between the inside surface and the outside surface are not clear. While not desiring to be bound the following explanation can be given. The surface of the film forming solution absorbs the poor solvent immediately after spinning and a phase separation occurs only in the surface portion. A characteristic feature of the first embodiment of the present invention lies in that the phase separation is established only in a shallow portion of the outside surface of the hollow fiber by delicately controlling the spinning speed, the distance between the spinning nozzle and the coagulating solution, the amount of evaporated poor solvent present in the space therebetween and the air speed. This control technique has enabled the formation of the minimum pore size layer in the interior of the membrane. This could not have been attained by conventional spinning processes.

In the second embodiment of the present invention, the film forming solution discharged through a nozzle for spinning a hollow fiber is introduced into a coagulating solution, and drafted in a drafting ratio of 1.5 to 4, preferably 1.5 to 3. The drafting rate is up to 400 m/min, preferably up to 200 m/min, preferably 20 to 150 m/min, at which a stable surface state may be obtained. Immediately after introduction of the film forming solution into the coagulating solution, a skin layer is formed on the surface of the hollow fiber. Upon subsequent drafting of the fiber, the fiber is split to form a hollow fiber membrane with a large opening ratio of the surface.

Conventionally draft upon spinning of the hollow fiber in a coagulating bath has often been conducted. However, in conventional drafting, it has been believed important not to split the surface, since conventional hollow fiber membranes have a minimum pore size in the surface skin layer. On considering that splitting would enlarge the minimum pore size, the above-described belief is quite reasonable.

In the second embodiment of the present invention, however, since the minimum pore size is not formed in either of the outside or the inside surfaces of the membrane but is formed in an intermediate portion between the inside surface and the outside surface, splitting of the surface does not adversely influence the minimum pore size.

An important point for successfully conducting the second embodiment of the present invention is proper adjustment of the amount of evaporation of the solvent and the amount of moisture absorbed from the air at the surface of fiber-like solution when the film forming solution is discharged through the nozzle traveling from the nozzle to the coagulating bath. For example, this adjustment can be achieved by employing a distance of 1 to 30 cm from the spinning nozzle to the coagulating solution, by using n-hexane and water as a core solution and a coagulating solution, respectively, and passing the fiber through an atmosphere of a temperature of 0° to 60° C., preferably 10° to 50° C. and a relative humidity of 10 to 80%, preferably 20 to 60%. The space between the nozzle and the coagulating solution may be surrounded by a cylindrical hood with the atmosphere therein being fluidized at a constant air velocity to thereby form a stable hollow fiber.

The reasons for the formation of the minimum pore size-containing portion in the interior between the inside surface and the outside surface are not clear, but, again without being bound, they may be surmised as follows. That is, the surface of the film forming solution absorbs the poor solvent immediately after spinning and phase separation only in the surface portion occurs.

In the second embodiment of the present invention, splitting of the surface, which enlarges the surface pore size, does not adversely affect the filtration performance, particularly particle-trapping performance, since the minimum pore size-determining layer of the membrane is present in the interior of the membrane.

In a third embodiment of the present invention, the solvent to be discharged through an intermediate nozzle and to be used for the hollow fiber-forming polymer of, for example, a polysulfone, is a mixed solution of dimethylacetamide, dimethylformamide, N-methyl-2-pyrrolidone, tetrahydrofuran, etc. or a mixture thereof and a poor solvent for the polysulfone such as water, an alcohol (e.g., methanol, ethanol, butanol), a glycol ether (e.g., ethylene glycol, diethylene glycol), an aliphatic hydrocarbon (e.g., n-hexane, n-heptane) or a glycerol (e.g., glycerin). The liquid to be discharged through an internal nozzle may be the above-described poor solvent or a mixed solution of the above-described poor solvent and the above described solvent in any mixing ratio. In view of the purpose of the present invention, however, coagulating action of the liquid to be discharged through the intermediate nozzle must be weaker than that of the liquid to be discharged through the internal nozzle. For example, in using an N-methyl-2-pyrrolidone/water mixture discharged through the intermediate nozzle and the internal nozzle, the ratio of N-methyl-2-pyrrolidone/water of the mixture discharged through the intermediate nozzle must always be larger than that to be discharged through the internal nozzle.

In the third embodiment, too, any solvent that is a poor solvent for the polymer may be used as a coagulating bath. For a polymer of, for example, polysulfone, any solvents which do not dissolve the membrane-forming polymer, such as water, alcohols (e.g., methanol, ethanol, butanol), glycol ethers (e.g., ethylene glycol, diethylene glycol), aliphatic hydrocarbons (e.g., n-hexane, n-heptane) and glycerols (e.g., glycerin) may be used. The coagulating rate can be increased by adding an appropriate solvent. For example, N-methyl-2-pyrrolidone may be added in an amount of up to 40% to water.

When individual liquids are simultaneously discharged through the triple-ring nozzle, the inside of the film forming solution comes into contact with the solvent immediately after being discharged. Thus rapid coagulation is prevented and no skin layer is formed. Hence, a large pore size is formed in the inside surface of the hollow fiber.

The viscosity of the polymer solution to be discharged ranges preferably from about 1000 cp to about 50000 cp. A viscosity outside this range results in poor spinning properties. The temperature of the coagulating bath ranges preferably from −40° to 80° C., more preferably 0° C. to 60° C. Temperatures higher than 80° C. or lower than 0° C. makes it difficult to obtain a stable hollow fiber surface. The spinning rate is preferably 1 to 100 m/min, preferably 5 to 100 m/min. If it is less than 1 m/min, it becomes difficult to balance the injecting rate of the core solution to achieve a well balanced hollow fiber form. Thus a hollow fiber with a stable form is not obtained. On the other hand, if the spinning rate exceeds 100 m/min, a hollow fiber with a stable form cannot be obtained due to vibration during traveling of the fiber. The temperature of the atmosphere from the hollow fiber-forming nozzle to the coagulating solution is suitably about 0° to 60° C., preferably 10° to 50° C. and the humidity is about 20% to about 80%, preferably 20 to 60%. Preferably, air of a constant velocity to the surface of a spun hollow fiber of, for example, 0.2 m/sec to 20 m/sec, preferably 0.8 m/sec to 10 m/sec, may be employed to obtain a hollow fiber membrane with stable pore size.

In the third embodiment of the present invention, it has been found effective for the core solution to have a two-layer structure and to use a polymer solvent as a liquid to be directly in contact with the film forming solution for the purpose of changing the membrane structure, specifically pore size, etc. by decreasing the coagulating rate of the film forming solution in the dry-and-wet spinning process.

A technique for decreasing the coagulation rate has been a technique of using merely a mixed solution of a solvent and a poor solvent as a core solution. However, this core solution has a constant coagulating ability. Hence it fails to enlarge pore size at the extreme surface of the inside surface. On the other hand, using the technique of the present invention, the interior of the hollow fiber membrane forms an ideal network structure because the core solution immediately permeates into the interior of the fiber though the surface of the film forming solution brought into contact with the intermediate solution undergoes a delayed coagulation. Thus, filtration resistance due to the inside skin layer as with the conventional membrane can be reduced, and a hollow fiber membrane with high practical value having a high flow rate can be obtained.

A hollow fiber porous membrane of, for example, polysulfone has conventionally been utilized as an ultrafiltration membrane or the like employing the good heat resistance and chemical resistance properties of the polysulfone. However, it possesses still insufficient properties in terms of filtration flow rate. In the third embodiment of the present invention, a hollow fiber porous membrane having sufficient filtration flow rate is easily obtained by the dry-and-wet spinning process. Therefore, this hollow fiber membrane can be employed in fields requiring high-pressure vapor sterilization such as bioreactors and the food industry.

The pore size range that can be achieved using the present invention which is particularly found in the intermediate portion is substantially within a range of 0.05 μm to 1 μm.

The proportion of the intermediate layer that can be present in the hollow fiber membrane produced in the present invention is 2.5 to 20% of the film thickness.

The depth from the surface of the intermediate layer in the hollow fiber membrane produced in the present invention is 2 μm to 20 μm.

The drafting range which can be used in the present invention to split the surface of the fiber is 20 to 150 m/min.

The present invention is now illustrated in greater detail by reference to the following examples which, however, are not to be construed as limiting the present invention in any way. Unless otherwise indicated herein, all parts, percents, ratios and the like are by weight.

EXAMPLE 1 TO 3

A film forming solution of 22 wt % of polysulfone (AMOCO Co.; P-3500), 8 wt % of N-methyl-2-pyrrolidone, 16 wt % of polyvinylpyrrolidone, 2 wt % of LiCl and 2 wt % of water was kept at 25° C. and was discharged through a spinning orifice (inside diameter of cyclic nozzle: 1.0 mm; outside nozzle diameter: 2.0 mm) using hexane as a core solution, then fed into a 25° C. coagulation bath (water) spaced 15 cm downward. Spinning was conducted at a constant take-up speed of 40 m/sec while changing the humidity and the air velocity of the atmosphere. All of the hollow fibers thus obtained had an external diameter and an internal diameter of about 1.0 mm and about 0.8 mm, respectively.

The amount of water permeation of the hollow fiber membrane obtained in Example 1 was 1.2 ml/cm$^2$/min/kg/cm$^2$. The cross section of each of the hollow fiber membranes obtained in Examples 1 to 3 was observed under a scanning type electron microscope to measure the depth to the minimum pore size layer from the outside surface. Results thus obtained are tabulated in Table 1 below.

TABLE 1

| Example 1 | Humidity (%) | Air Velocity (m/sec) | Depth to Minimum Pore Size Layer (μm) |
| --- | --- | --- | --- |
| 1 | 50 | 0.8 | 5 |
| 2 | 50 | 1.5 | 12 |
| 3 | 80 | 0.8 | 10 |

EXAMPLE 4

Spinning was conducted in the same manner as in Example 1 using a film forming solution of the same formulation as in Example 1 except for changing the atmosphere conditions to a humidity of 40% and an air velocity of 3 m/min to obtain a hollow fiber membrane. The thus-obtained hollow fiber membrane had a dense layer positioned in the intermediate portion at a distance of about 20 μm from the outside surface.

COMPARATIVE EXAMPLE 1

Spinning was conducted in the same manner as in Example 1 using a film forming solution of the same formulation as in Example 1 except for changing the atmosphere conditions to a humidity of 0% to obtain a hollow fiber membrane. A skin layer existed at the outside surface of the resulting hollow fiber membrane.

The water permeation amount of the thus-obtained hollow fiber membrane was bound to be 0.04 ml/cm$^2$/min/kg/cm$^2$.

EXAMPLE 5

A dope solution composed of 22 wt % of polysulfone (AMOCO Co.; P-3500), 60% of N-methyl-2-pyrrolidone, 15% of polyvinylpyrrolidone, 2% of LiCl and 2% of water was kept at 25° C. and was discharged through a spinning orifice using a mixed solution of hexane and N-methyl-2-pyrrolidone (1:1 by volume) as a core solution, then fed into a coagulation bath (water) spaced 15 cm downward. Spinning was conducted in an atmosphere of a humidity of 48% and an air velocity of 1.2 m/min, and a hollow fiber membrane was formed at a discharge rate of 10 m/min and a take-up speed of 30 m/min. The thus-obtained hollow fiber membrane had a split outside surface, with a dense layer being formed in the intermediate portion between the outside surface and the inside surface.

COMPARATIVE EXAMPLE 2

A hollow fiber membrane obtained by spinning under the same conditions as in Example 5 using a film forming solution of the same formulation as in Example 5 except for changing the humidity of the atmosphere to 0% had a skin layer formed on its surface. Hence surface splitting by drafting in the coagulation solution resulted in breakage of the minimum pore size layer present in the outside surface.

Table 2 shows the results on comparing the ability to trap a latex of a diameter of 0.109 μm.

TABLE 2

|  | Example 5 | Comparative Example 2 |
| --- | --- | --- |
| Latex-Trapping Ability (Removing ratio %) | 99.99 | 67.0 |
| Water-Permeating Rate (ml/min/cm$^2$/kg/cm$^2$) | 6.2 | 5.4 |

EXAMPLE 6

A spinning solution comprising 22 wt % of polysulfone (AMOCO Co.; P-3500), 60 wt % of N-methyl-2-pyrrolidone, 15 wt % of polyvinylpyrrolidone, 1 wt % of LiCl and 2 wt % of water was discharged through an external nozzle (cyclic nozzle of an inside diameter of 2.0 mm and an outside diameter of 2.7 mm) in a discharge rate of 15 ml/min simultaneously with water discharged through an inside nozzle (of circular hollow form of a diameter of 0.4 mm) in a dischage rate of 7 ml/min and N-methyl-2-pyrrolidone through an intermediate nozzle (of a ring form of an inside diameter of 0.5 mm and an outside diameter of 1.4 mm) in a discharge rate of 0.8 ml/min, then allowed to travel for 1 second through air of a relative humidity of 80% and a temperature of 25° C. and fed into an 25° C. coagulating solution of water, followed by washing with warm water at 60° C. to obtain a hollow fiber membrane. The electron micrograph showing the inside of the hollow fiber membrane revealed that, in comparison with a hollow fiber membrane obtained without using the intermediate nozzle, the inside possessed a larger pore size and the membrane had an anisotropic structure wherein the pore size becomes gradually smaller towards the outside.

COMPARATIVE EXAMPLE 3

Spinning was conducted under the same conditions as in Example 6 using a spinning solution of the same formulation as in Example 6 and using a double-pipe nozzle, while discharging the film forming solution through an external nozzle (of ring form of an inside diameter of 2.0 mm and an outside diameter of 2.7 mm) in a discharge rate of 15 ml/min and water through an internal nozzle (of circular hollow form of a diameter of 1.5 mm) in a discharge rate of 8.0 ml/min.

Electron micrographs of these hollow fiber membranes showed that, while a skin layer was formed in the hollow fiber membrane obtained without using the intermediate nozzle, the hollow fiber membrane of the present invention formed a large pore size in the interior. The water permeating amounts of the membranes of Example 6 and Comparative Example 3 are comparatively tabulated in Table 3. It can be seen that, although the rates of micro-particle removal were the same, the hollow fiber membrane of the present invention showed an extremely excellent water-permeating amount.

TABLE 3

|  | Example 6 | Comparative Example 3 |
| --- | --- | --- |
| Micro-Particle-Removal Ability (Note 1) | 99.99% | 99.98% |
| Water-Permeating Amount ($ml/cm^2/kg/cm^2/min$) | 6.2 | 2.8 |

(Note 1) 0.05-μm Latex was used.

While the invention has been described in detail and with reference to specific embodiments thereof, it is apparent to one skilled in the art that various changes and modifications can be made therein without departing from the spirit and scope of the present invention.

What is claimed is:

1. A hollow fiber membrane having an outside surface, an inside surface, and an intermediate portion located between the outside surface and the inside surface,
    wherein a minimum pore size exists in the intermediate portion, and
    wherein the membrane has pores which continuously and gradually decrease in pore size from the outside surface to the minimum pore size in the intermediate portion and which continuously and gradually increase in pore size from the minimum pore size in the intermediate portion to the inside surface.

2. A hollow fiber membrance as claimed in claim 1, wherein the pore size ranges from 0.005 to 1 μm.